(12) United States Patent
Hauet et al.

(10) Patent No.: US 8,129,043 B2
(45) Date of Patent: Mar. 6, 2012

(54) SYSTEM, METHOD AND APPARATUS FOR STRAIN-ASSISTED MAGNETIC RECORDING FOR CONTROLLING SWITCHING FIELD AND TIGHTENING SWITCHING FIELD DISTRIBUTION IN BIT PATTERNED MEDIA

(75) Inventors: Thomas Hauet, San Jose, CA (US); Olav Hellwig, San Jose, CA (US); Lidu Huang, Danville, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 233 days.

(21) Appl. No.: 12/423,258

(22) Filed: Apr. 14, 2009

(65) Prior Publication Data

US 2010/0259846 A1    Oct. 14, 2010

(51) Int. Cl.
*G11B 5/66*    (2006.01)
(52) U.S. Cl. .................................. 428/831; 428/827
(58) Field of Classification Search .................. None
See application file for complete search history.

(56) References Cited

U.S. PATENT DOCUMENTS

| | | | |
|---|---|---|---|
| 3,949,387 A | 4/1976 | Chaudhari et al. | |
| 4,794,560 A | 12/1988 | Bell et al. | |
| 5,239,504 A | 8/1993 | Brady et al. | |
| 6,387,476 B1 | 5/2002 | Iwasaki et al. | |
| 6,483,741 B1 | 11/2002 | Iwasaki et al. | |
| 6,773,826 B2 | 8/2004 | Nakagawa et al. | |
| 6,985,318 B2 | 1/2006 | Clinton et al. | |
| 7,166,376 B2 * | 1/2007 | Hikosaka et al. | 428/829 |
| 7,230,308 B2 | 6/2007 | Iwata | |
| 7,282,755 B2 | 10/2007 | Pakala et al. | |
| 7,838,135 B2 * | 11/2010 | Kuo et al. | 428/829 |
| 2005/0202287 A1 | 9/2005 | Lu et al. | |
| 2006/0222904 A1 * | 10/2006 | Hsia et al. | 428/832 |

FOREIGN PATENT DOCUMENTS

| | | |
|---|---|---|
| EP | 0860816 A1 | 8/1998 |
| JP | 2005259319 | 9/2005 |

OTHER PUBLICATIONS

Lee, Jeong-Won, et al., Spin Engineering of CoPd Alloy Films Via the Inverse Piezoelectric Effect, Applied Physics Letters, vol. 82, No. 15, Apr. 2003.
Wang, Jian-Ping, Magnetic Data Storage, Tilting for the Top, Nature Publishing Group, vol. 4, Mar. 2005.
Boukari, H., et al., Voltage Assisted Magnetic Switching in Co50FE50 Interdigitated Electrodes on Piezoelectric Substrates, Journal of Applied Physics 101, 054903, 2007.
Yamada, Michiya, et al., Magnetization Reversal Technique of DyTbFeCo Films at Magnetic Field as Low as 1/6 of Coercivity Using a Stress-Induced Magnetic Anisotropy, IEEE Transactions on Magnetics, vol. 43, No. 6, Jun. 2007.

(Continued)

*Primary Examiner* — Holly Rickman

(57) ABSTRACT

Multilayer magnetic structures control the switching field and tighten the switching field distribution in bit patterned media. A strain-inducing layer is excited, e.g., by a localized magnetic field or a localized thermal heating or a voltage, and induces a strain on the magnetic layer(s) of the patterned bit to initiate switching of the bit magnetization. The strain induced on the magnetic layer forces a rotation or an amplitude variation of the magnetic layer anisotropy. A localized magnetic field is simultaneously or subsequently applied to complete the switching of the bit magnetization. The invention provides control of switching field and switching field distribution for bit-patterned media devices.

8 Claims, 3 Drawing Sheets

OTHER PUBLICATIONS

Suess, D., et al., Exchange Spring Media for Perpendicular Recording, Applied Physics Letters 87, 012504 (2005).

Schabes, Manfred E., et al., Micromagnetic Simulations for Terabit/in2 head/media systems, Journal of Magnetism and Magnetic Materials 320 (2008) 2880-2884.

Baril, Lydia, et al., Magnetostriction in Spin Valves, Journal of Applied Physics, vol. 85, No. 8, Apr. 1999.

Wang, Dexin, et al., Magnetostriction Effect of Amorphous CoFeB Thin Films and Application in Spin-Dependent Tunnel Junctions, Journal of Applied Physics 97, 10C906 (2005).

Nakagawa, S., et al., Stress Induced Enhancement of Magnetization REversal Process of DyFeCo Films with Perpendicular Magnetization, IEEE Transactions on Magnetics, vol. 42, No. 11, Nov. 2006.

Fu, Y.Q., et al., on the Lower Thickness Boundary of Sputtered TiNi Films for Shape Memory Application, Elsevier, Thin Solid Films 515 (2006) 80-86.

Wunderlich, Joerg, et al., Magnetoresistive Device.

* cited by examiner

SYSTEM, METHOD AND APPARATUS FOR STRAIN-ASSISTED MAGNETIC RECORDING FOR CONTROLLING SWITCHING FIELD AND TIGHTENING SWITCHING FIELD DISTRIBUTION IN BIT PATTERNED MEDIA

BACKGROUND OF THE INVENTION

1. Technical Field

The present invention relates in general to hard disk drives and, in particular, to an improved system, method and apparatus for strain-assisted magnetic recording that allows controlling magnetic switching field value and tightening of magnetic switching field distribution in bit patterned media.

2. Description of the Related Art

Bit patterned media (BPM) is a leading candidate to extend the data areal densities of magnetic recording beyond those achievable by conventional continuous perpendicular magnetic recording based on granular recording media. The islands of BPM need to be sufficiently small and of sufficient magnetic quality to support high bit areal densities (e.g., at 1 $Tb/in^2$). The islands have diameters that are approximately 15 to 20 nm (e.g., assuming a unit cell of 25.4 $nm^2$), with trenches having widths of about 10.4 to 15.4 nm, and a bit aspect ratio (BAR) of about 1. Moreover the switching field distribution (SFD) may need to be smaller than 1000-1500 Oe, depending on the head field gradient and other system parameters. See, e.g., M. E. Schabes, "Micromagnetic Simulations for Terabit/$in^2$ Head/Media Systems," J. Magn. Mag. Mat., (2008). Furthermore since the field of the write head becomes smaller as the size of the write head is decreased, maintaining the writeability and thermal stability of the islands are issues for BPM.

One critical issue for the development of BPM is that the SFD (i.e., the bit-to-bit variation of the coercive field) should be narrow enough to secure exact addressability of individual predefined bits without overwriting adjacent bits. The SFD has many origins, such as variations in the patterned dot sizes, shape and spacing, intrinsic magnetic anisotropy distribution, and dipolar interaction.

Another critical issue for the increase of BPM areal density is how to reduce the lateral size of the bit-dots, as well as the distance between two neighbors without decreasing the thermal stability of the magnetic media. To do so, a large increase in the media anisotropy is required, although the magnetic write field cannot be increased extensively due to head field limitations. Energy-assisted recording has been proposed to locally decrease the switching field value during the writing process while keeping a very good thermal stability at rest.

To solve the SFD problem and to control the switching field value while keeping a good thermal stability in the media, one aspect of the present invention is to change the anisotropy amplitude or the anisotropy direction of the magnetic media before and/or during the write process.

Change in the amplitude and direction of the anisotropy can be achieved by adding one or more transition layers that induce a strain on the media layer via its own structural changes. See, e.g., H. Boukari, et al., J. Appl. Phys. 101, 054903 (2007); and J. W. Lee, et al., Appl. Phys. Lett. 82, 2458 (2003).

For a magnetic layer whose anisotropy is locally controlled via a strain induced by a strain-inducing layer (SIL), the strain transferred from the SIL to the magnetic layer (ML) is increased as the lateral dimension of the magnetic part is decreased. In the case of continuous granular media currently used in hard disk drives, the strain affecting one bit is constrained by the neighboring bits. In bit patterned media technology, each bit consists of a single island that is physically separated form the neighboring bits. As a consequence, there is no lateral brake to the SIL and ML volume variations of the bit and the effect of the strain on the ML magnetic anisotropy is maximal.

SUMMARY OF THE INVENTION

Embodiments of a system, method, and apparatus for strain-assisted recording for controlling switching field and tightening switching field distribution in bit patterned media are disclosed. For example, strain-inducing layer (SIL)/magnetic layer (ML) patterned structures or strain-inducing layer (SIL)/magnetic layer (ML)/strain-inducing layer (SIL) structures are used to induce a variation of the anisotropy in the ML during the write process.

In each bit of a BPM system, the high anisotropy media layer (ML) is coupled to a strain-inducing layer (SIL) whose lattice parameter or crystalline structure changes either by application of a magnetic field pulse, a temperature pulse or by any other excitation leading to a change or transition in the SIL crystalline structure. As the SIL lattice varies, a strain is transferred to the ML that leads to the rotation or the amplitude variation of the ML anisotropy via the inverse magnetostriction effect inside the ML.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the present invention are attained and can be understood in more detail, a more particular description of the invention briefly summarized above may be had by reference to the embodiments thereof that are illustrated in the appended drawings. However, the drawings illustrate only some embodiments of the invention and therefore are not to be considered limiting of its scope as the invention may admit to other equally effective embodiments.

DETAILED DESCRIPTION OF THE INVENTION

Figure 1A:
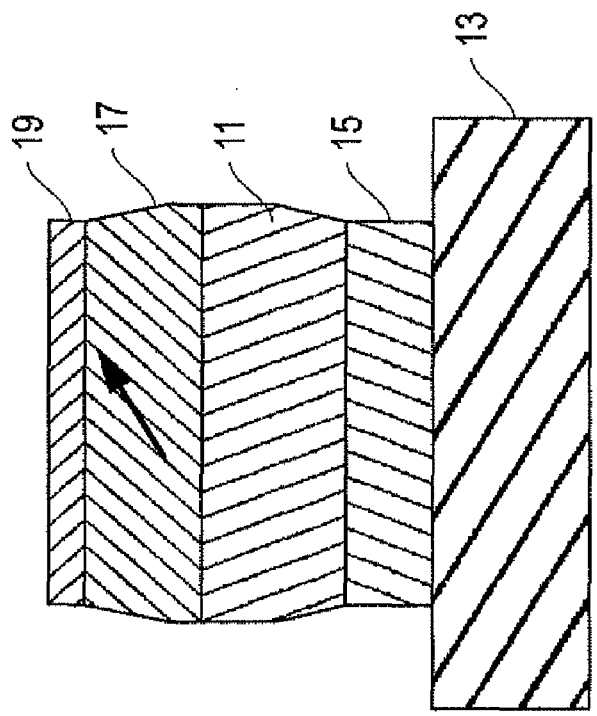
FIG. 1 depicts schematic side views of patterned media stacks at rest or when the SIL is activated, i.e., when it stresses the ML layer, and are constructed in accordance with the invention.
Figure 1B:
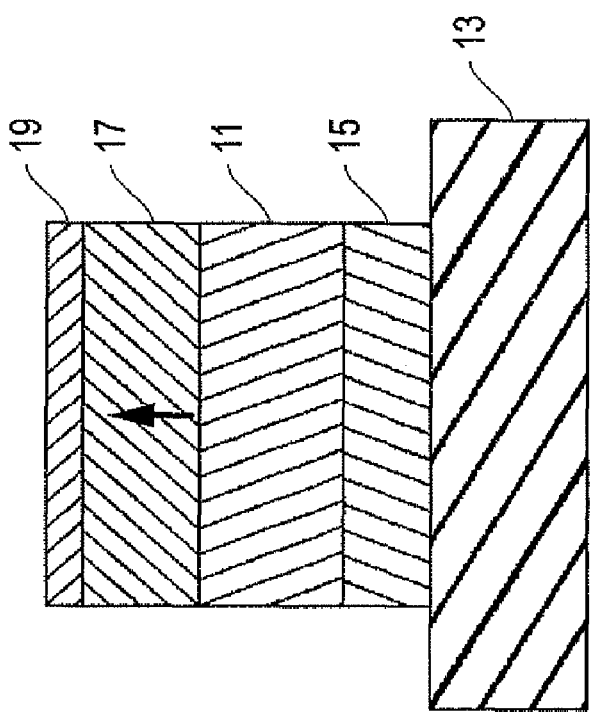
Figure 2:
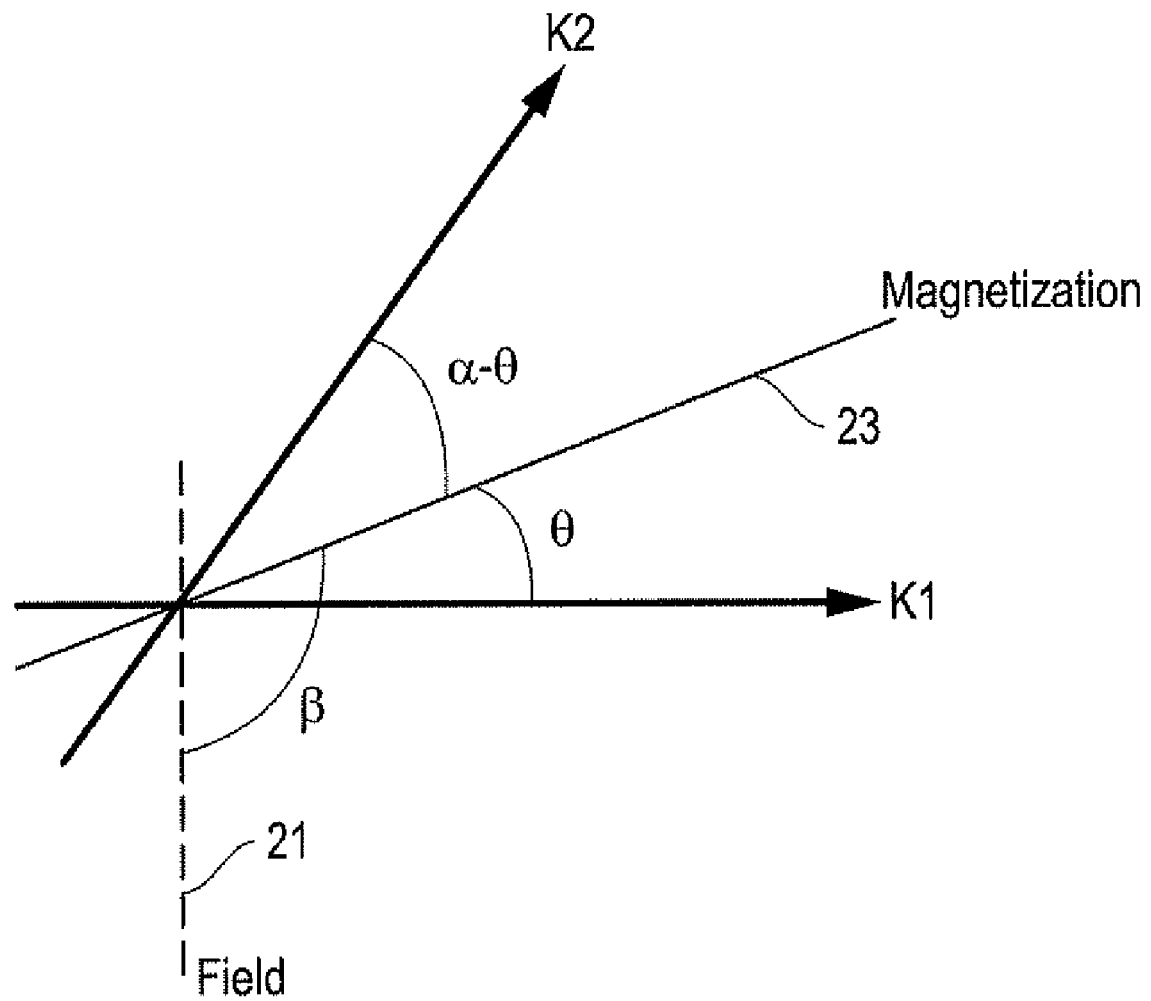
FIG. 2 depicts schematic views of the different anisotropies involved inside the ML and are constructed in accordance with the invention.
Figure 3:
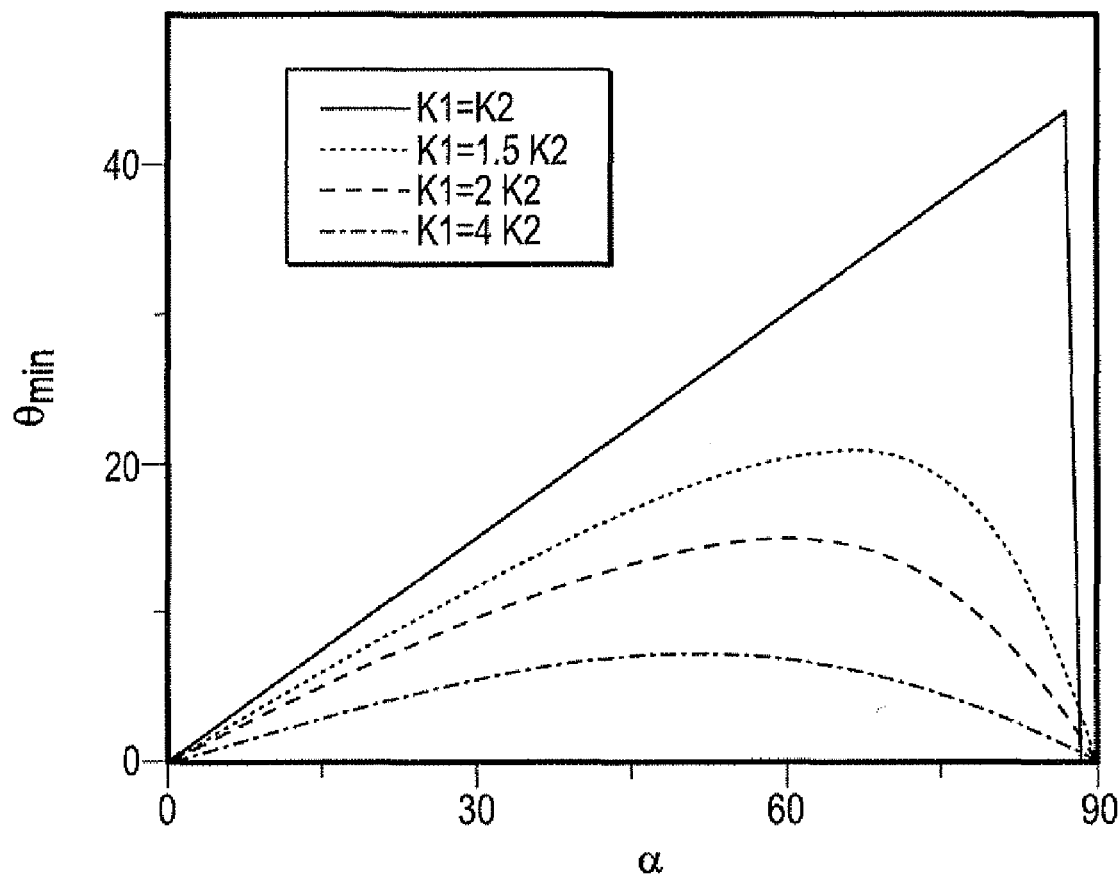
FIG. 3 depicts schematic diagrams of the energetically stable θ, i.e., the angle between the magnetization and the magneto-crystalline anisotropy direction, as a function of the angle α defined as the orientation of the additional strain-induced anisotropy, and are constructed in accordance with the invention.

Referring to FIGS. 1, 2 and 3, embodiments of a system, method and apparatus of strain-assisted recording for controlling reversal mechanism and tightening switching field distribution in bit patterned media are disclosed.

FIG. 1 depicts schematic side views of patterned media stacks, that may be used for bit patterned strain-assisted recording, under no excitation (FIG. 1A) and under excitation (FIG. 1B), i.e., as the SIL lattice 11 is at rest or distorted respectively. FIG. 1 is a representative of a strain-induced rotation of the ML anisotropy.

In one embodiment, the simplest structure of the multilayer used as media for bit patterned media in the invention may comprise a seed layer 13, a buffer layer 15, the magnetic media layer (ML) 17, the strain-inducing layer (SIL) 11, and a cap layer 19. The ML may be a multilayer or alloy, amorphous, crystalline or polycrystalline, with an out-of-plane, in-plane, or another direction of magnetic anisotropy with respect to the film plane. Magnetic or non-magnetic film materials may be deposited on an object as, e.g., either a large substrate (disk) or on some dot already formed on the disk. In either case, the top of the object is supposed to be flat. This flat top surface defines the direction of growth of the magnetic or non-magnetic film (perpendicular to the flat top surface). The "plane" of deposited layers (films) is therefore parallel to the flat top surface. The "film plane" indicates the two-dimensional direction of the substrate surface in space. It can contain transition metals (e.g., Co, Fe, Ni) and/or 5d metals (e.g., Pt, Pd) and/or rare earth metals (e.g., Tb, Dy, Sm) and/or segregant (e.g. B, Cr, $SiO_x$, $TaO_x$). The ML may be engineered as a combination of alloys and multilayers.

The SIL dimension variation can originate from different effects. In one case, the SIL can be a magnetostrictive material (e.g. SmDyFe, $Tb_{1-x}Fe_x$, $Fe_3Pt$, Fe/Pt, etc.) whose lattice is distorted when the writing field is applied. During a write cycle, the disk drive head applies a magnetic field on a given pre-patterned bit/dot. The magnetostrictive SIL overcomes a lattice distortion and therefore induces a strain on the ML. The structural change applied to the ML generates a rotation or an amplitude variation of the ML total anisotropy. The SIL may be engineered as a combination of alloys and multilayers, and the invention is compatible with having a soft underlayer (SUL) below the patterned dots. The SUL may be located below or included in the seed layer.

In another case, the SIL can be magnetic or nonmagnetic and overcome a large structural change at temperatures between 350 and 700 Kelvin (e.g. shape memory alloy, etc.). For certain non-magnetic or magnetic materials, the stable crystalline phase (i.e., the organization of the atoms inside the material) is changing from one temperature to another. Analogously, water is liquid for temperatures higher than 0° C. and solid for temperatures lower than 0° C. During a write cycle, the disk drive head initially heats up a given pre-patterned bit/dot to a transition temperature. The SIL changes its structure thus inducing a strain on the ML. The structural change applied to the ML generates a rotation or an amplitude variation of the ML anisotropy. Again, the SIL may be engineered as a combination of alloys and multilayers, and the invention is compatible with having an SUL below the patterned dots.

In another case, the transition layer can be a piezoelectric layer (magnetic or non-magnetic) whose lattice parameters change with an applied voltage. See, e.g., H. Boukari, et al., J. Appl. Phys. 101, 054903 (2007); and J. W. Lee, et al., Appl. Phys. Lett. 82, 2458 (2003). During a write cycle, the disk drive head induces a difference of electrical potential between the disk and the head, strong enough to polarize the piezoelectric SIL of a given pre-patterned bit/dot. The electrical polarization induces a SIL structure distortion thus inducing a strain on the ML. The structural change applied to the ML generates a rotation or an amplitude variation of the ML anisotropy. The SIL may be engineered as a combination of alloys and multilayers, and the invention is compatible with having an SUL below the patterned dots.

The variation direction or amplitude of the ML anisotropy due to transferred stress from the SIL can be calculated as following. At rest, the direction of the ML magnetization orientation is ruled, within the Stoner-Wohlfarth assumptions, by the intrinsic magnetocrystalline anisotropies. In the case of a ML for bit patterned recording, the ML may be tuned to have a uniaxial anisotropy. The energy related to this uniaxial magnetocrystalline anisotropy is $E_1=K_1 \sin^2 \theta$ where K is the magnetocrystalline anisotropy constant, i.e. the anisotropy amplitude, and $\theta$ the angle between the magnetization and the magnetocrystalline anisotropy direction. The transferred strain from the SIL to the ML generates an additional magnetic uniaxial anisotropy inside the ML. The energy related to the strain-induced anisotropy is $E_2=K_2 \sin^2(\alpha-\theta)$ where $\alpha$ is the angle between the magnetocrystalline anisotropy and the strain-induced anisotropy directions. As an example, in the case of a linear strain, $K_2$ is the strain induced anisotropy amplitude and would be calculated as $G\lambda\sigma$ where G is numerical constant depending on the lattice distortion, $\lambda$ the ML magnetostriction coefficient and $\sigma$ the strain amplitude. FIG. 2 shows the magnetocrystalline anisotropy and the strain-induced anisotropy inside the ML as well as the magnetic field 21 at an angle $\beta$ from the magnetization direction 23.

The most energetically stable position of the magnetization at remanence as a function of $K_1$, $K_2$ and $\alpha$ can be calculated as the $\theta$ value which minimizes the anisotropy energy $E_{tot}=E_1+E_2$. Various cases have to be differentiated.

In the case where $\alpha=0$ deg, the total anisotropy energy is $E_{tot}=(K_1+K_2)\sin^2 \theta$. Therefore, the strain does not affect the overall anisotropy direction but the amplitude of the anisotropy along the magnetocrystalline anisotropy direction. As a function of the sign of the magnetostriction constant $\lambda$ and the sign of the strain $\sigma$ (i.e. elongation or compression of the ML lattice), the anisotropy amplitude can be increased or decreased due to the strain compared with $K_1$.

In the case where $\alpha=90$ deg, the total anisotropy energy is $E_{tot}=K_1 \sin^2 \theta+K_2 \sin^2(90-\theta)$. Therefore if $K_1=K_2$, the total anisotropy energy, $E_{tot}=2K_1=2K_2$, does not depend on the magnetization orientation. In that case, the strain induces the suppression of the ML magnetocrystalline anisotropy. If $K_1 \neq K_2$, the anisotropy energy has two minima corresponding to the case where the magnetization is along the ML magnetocrystalline anisotropy axis and the case where the magnetization is along the strain-induced anisotropy axis.

In the case where $\alpha \neq 0$ deg and $\alpha \neq 90$ deg, the total anisotropy energy is $E_{tot}=K_1 \sin^2 \theta+K_2 \sin^2(\alpha-\theta)$. Then, the most energetically stable magnetization position is given by $\theta_{min}=\tan^{-1}[(K_1 \sin 2\alpha)/(K_2+K_1 \sin 2\alpha)]$ FIG. 3 is a diagram of $\theta_{min}$ as a function of $\alpha$, for different values of $K_2$.

Applied to bit patterned media, the strain-induced rotation or amplitude decrease of the ML anisotropy has three main effects. The first one is to decrease the switching field during the writing. Indeed, within the Stoner-Wohlfart model, the switching field can be reduced by 50% when the angle $\beta$ between magnetization and magnetic field direction is reduced from 0 deg to 45 deg. See, e.g., J. P. Wang, Nature, Mater. 4, 191 (2005); and M. Yamada and S. Nakagawa, IEEE Trans. Mag. 43, 2346 (2007).

The second effect is to decrease the switching field distribution, i.e., the dot-dot variation of switching field. Indeed, in the case of a strain-assisted writing process, the switching field value is no longer defined by the intrinsic properties of the ML. As an example, a strain-assisted rotation of the ML anisotropy, i.e. of the ML magnetization, from $\beta=180$ deg to 135 deg relative to the field direction decreases the switching field distribution originating from the intrinsic distribution of anisotropy direction in the ML (see FIG. 2). Indeed, within the Stoner-Wohlfarth assumptions, the evolution of switching field due to a Δβ variation for β=135 deg is very small compared with the switching field variation due to the same Δβ around β180 deg.

The third effect is to increase the addressability of single bits during the write process. Using the activation of the SIL in combination with a write field pulse increases the selectivity for the bit that has to be written, since both SIL activation and magnetic field directly acting on the ML are to first order independent processes. Therefore their distributions add independently, thus yielding a narrower total switching field distribution.

In still other embodiments, depending on how fast the strain can be released from the dot, strain-assisted recording can be used to increase the write process speed. In a sub-ns range, as the strain is transferred from the SIL to the ML, the ML magnetization is not instantaneously re-oriented or relaxed along the new anisotropy axis direction, but starts processing around the new anisotropy axis. This effect is described by the Landau-Lifshitz-Gilbert (LLG) equation. The magnetization precession can be large enough to bring the magnetization further than 90 deg away from its remanent position. If the strain is removed at the time where the magnetization is further than 90 deg away from its remanent position, the magnetization is forced onto a new trajectory towards the remanent anisotropy direction at 180 degrees from its original orientation. Therefore, depending on how fast the strain can be released from the dot, the magnetization switching can be operated using only one magnetization precession around the strain-induced anisotropy axis, i.e., on a sub-nanosecond scale.

In still other embodiments, if the excitation pulse and anisotropy change is controlled well enough (primarily with respect to timing), and if the bit is read before being written, a magnetic field may not be necessary to switch the magnetization and it could solely be controlled via the SIL and the correct timing of switching it on and off (of activating and de-activating it).

Other examples of the invention may include a system for strain-assisted recording for controlling reversal mechanism and tightening switching field distribution in bit patterned media, comprising: a seed layer; a buffer layer on the seed layer; a strain-inducing layer (SIL) on the buffer layer; a magnetic media layer (ML) on the SIL; a cap layer on the ML; and the SIL induces a strain on the ML, such that a structural change applied to the ML generates a rotation or an amplitude variation of the total anisotropy of the ML.

The ML may comprise at least one of a multilayer, alloy, amorphous, crystalline and polycrystalline material, and the SIL is above the ML. The ML also may comprise a uniaxial anisotropy that is one of out-of-plane, in-plane or any other direction with respect to a film plane, and the ML is sandwiched between a pair of SIL layers. Alternatively, the ML may comprise at least one transition metal selected from the group consisting of Co, Fe and Ni, and/or at least one 5d metal selected from the group consisting of Pt and Pd, and/or at least one rare earth metal selected from the group consisting of Tb, Dy and Sm, and/or at least one segregant selected from the group consisting of B, Cr, $SiO_x$ and $TaO_x$. The ML may further comprise a combination of alloys and multilayers.

In some embodiments, the SIL is a magnetostrictive material selected from the group consisting of: SmDyFe, Tb1-xFex, Fe3Pt and Fe/Pt, whose lattice is distorted when a write field is applied. In another alternative, the SIL is magnetic or nonmagnetic, and is characterized by a large structural change at temperatures between 350 and 700 Kelvin. In addition, the SIL may have a piezoelectric layer whose lattice parameters change with an applied voltage, and/or the SIL may comprise one of an alloy or a multilayer, and combines the properties of magnetostriction, large structural change at temperatures between 350 and 700 Kelvin, and a piezoelectricity.

While the invention has been shown or described in only some of its forms, it should be apparent to those skilled in the art that it is not so limited, but is susceptible to various changes without departing from the scope of the invention.

We claim:

1. A system for strain-assisted recording for controlling a reversal mechanism and tightening a switching field distribution in non-continuous, bit patterned media, comprising:
    a seed layer having a soft underlayer (SUL);
    a buffer layer on the seed layer;
    a pair of strain-inducing layers (SIL) comprising a shape memory alloy;
    a magnetic media layer (ML) between the pair of SIL, the ML having a uniaxial anisotropy, the ML comprises at least one transition metal selected from the group consisting of Co, Fe and Ni, at least one 5d metal selected from the group consisting of Pt and Pd, at least one rare earth metal selected from the group consisting of Tb, Dy and Sm, at least one segregant selected from the group consisting of B, Cr, $SiO_x$ and $TaO_x$, or a combination of alloys and multilayers;
    a cap layer on the ML;
    the SIL induces a strain on the ML, such that a structural change applied to the ML generates a rotation or an amplitude variation of an anisotropy of the ML;
    wherein the system comprises a non-continuous, bit patterned media.

2. A system according to claim 1, wherein the ML comprises at least one of a multilayer, alloy, amorphous, crystalline and polycrystalline material.

3. A system according to claim 1, wherein the SIL is a magnetostrictive material selected from the group consisting of: SmDyFe, Tb1-xFex, Fe3Pt and Fe/Pt, whose lattice is distorted when a write field is applied.

4. A system according to claim 1, wherein the SIL is magnetic or nonmagnetic, and is characterized by a large structural change at temperatures between 350 and 700 Kelvin.

5. A system according to claim 1, wherein the SIL has a piezoelectric layer whose lattice parameters change with an applied voltage.

6. A system for strain-assisted recording for controlling a reversal mechanism and tightening a switching field distribution in non-continuous, bit patterned media, comprising:
    a seed layer having a soft underlayer (SUL);
    a buffer layer on the seed layer;
    a pair of strain-inducing layers (SIL) comprising a shape memory alloy;
    a magnetic media layer (ML) between the pair of SIL, the ML having a uniaxial anisotropy, and the ML comprising at least one of a multilayer, alloy, amorphous, crystalline and polycrystalline material, at least one transition metal selected from the group consisting of Co, Fe and Ni, at least one 5d metal selected from the group consisting of Pt and Pd, at least one rare earth metal selected from the group consisting of Tb, Dy and Sm, at least one segregant selected from the group consisting of B, Cr, $SiO_x$ and $TaO_x$, or a combination of alloys and multilayers;
    a cap layer on the ML; and
    the SIL induces a strain on the ML, such that a structural change applied to the ML generates a rotation or an amplitude variation of an anisotropy of the ML;
    wherein the system comprises a non-continuous, bit patterned media.

7. A system according to claim 6, wherein the SIL is a magnetostrictive material selected from the group consisting of: SmDyFe, Tb1-xFex, Fe3Pt and Fe/Pt, whose lattice is distorted when a write field is applied.

8. A system according to claim 6, wherein the SIL is magnetic or nonmagnetic, is characterized by a large structural change at temperatures between 350 and 700 Kelvin, and the SIL has a piezoelectric layer whose lattice parameters change with an applied voltage.

* * * * *